Figure 1:
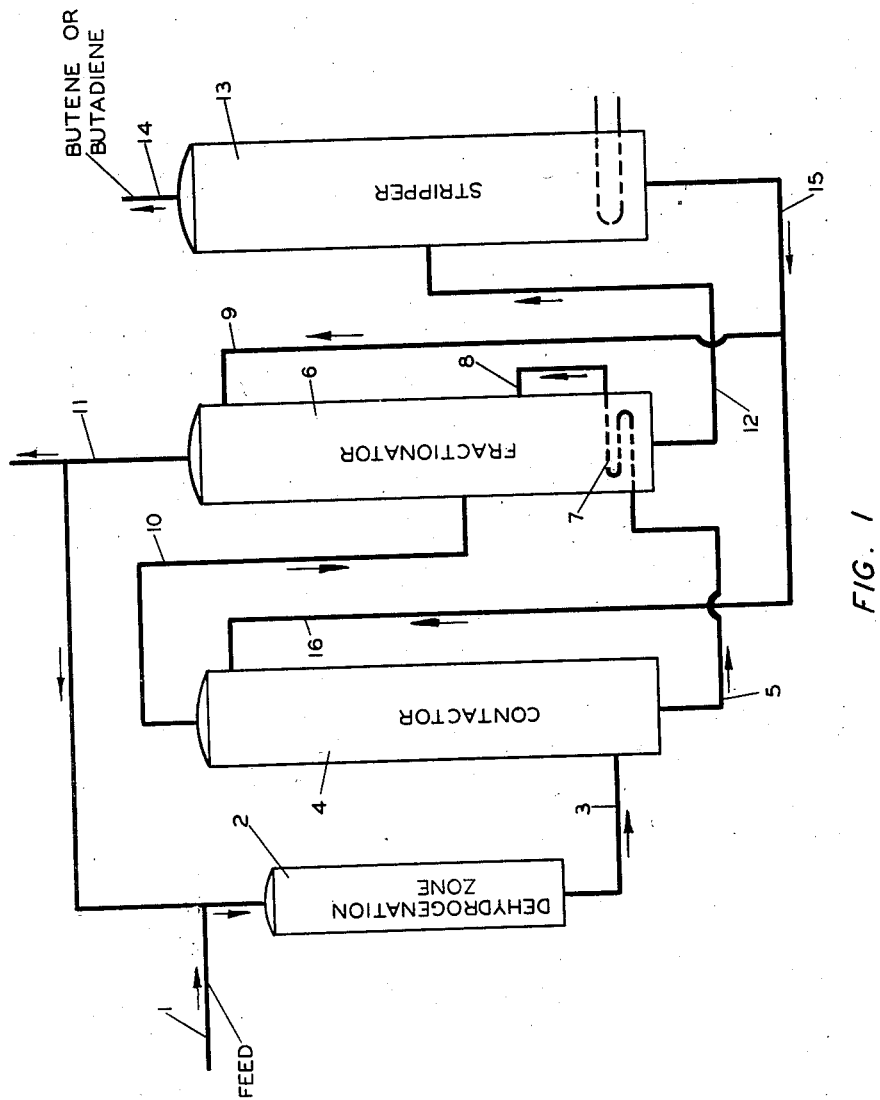

INVENTOR.
I.L. WOLK

Jan. 16, 1945.   I. L. WOLK   2,367,479
DEHYDROGENATION OF ALIPHATIC HYDROCARBONS
Filed Jan. 4, 1943   3 Sheets-Sheet 3

INVENTOR.
I. L. WOLK
BY Hudson, Young & Yinger
ATTORNEYS

Patented Jan. 16, 1945

2,367,479

UNITED STATES PATENT OFFICE 2,367,479

DEHYDROGENATION OF ALIPHATIC HYDROCARBONS

I. Louis Wolk, Bartlesville, Okla., assignor to Phillips Petroleum Company, a corporation of Delaware Application January 4, 1943, Serial No. 471,262

5 Claims. (Cl. 260—680)

This invention relates to the dehydrogenation of aliphatic or open-chain hydrocarbons, namely, paraffin and/or olefin hydrocarbons to the corresponding olefins and/or diolefins, and to the recovery and separation of the products formed thereby in a manner which will give increased yields with a minimum of side reactions. The invention relates especially to the two-stage catalytic dehydrogenation of normal butane to butadiene.

In the catalytic dehydrogenation of paraffins and olefins to the corresponding olefins and diolefins it has been heretofore proposed to prevent side reactions and polymerization in the hot dehydrogenation effluent by quenching or rapid cooling to a temperature below that at which these reactions will occur to any substantial degree. This has been accomplished by the injection of water or by similar cooling means, as proposed, for example, in the copending application of Schulze et al., Serial No. 412,636, filed September 27, 1941. The use of liquefied normally gaseous hydrocarbons for this purpose is described in Schulze et al. application, Serial No. 354,085, filed August 24, 1940. However, such processes have the disadvantage, among others, of requiring means for separating the coolant or quenching liquid from the products of reaction prior to application of purification or separation step. A further disadvantage is the loss or wastage of heat entailed by the quenching. Another disadvantage is the fact that separate steps must be provided after the quenching step in order to effect separation of the desired component of the reaction effluent, namely, the olefin or diolefin, from the undesired components which may be either discarded or recycled to suitable points in the process.

The principal object of the present invention is to provide a method which overcomes the foregoing disadvantages and presents important advantages over previous practice. Another object is to provide a method involving a novel quenching step in combination with separation and purification steps in such a way as to combine the functions of quenching and separating and to permit the utilization of the heat contained in the reaction effluent as a source of heat for the separation steps. Numerous other objects will hereinafter appear.

In accordance with my invention a more saturated aliphatic hydrocarbon, i. e., a paraffin and/or an olefin, is thermally or catalytically dehydrogenated to the corresponding less saturated hydrocarbon, namely, a monoolefin and/or a diolefin, and the resulting effluent is directly and immediately without loss of temperature contacted with a solvent material having preferential selectivity for the corresponding less saturated hydrocarbon formed by the dehydrogenation. This solvent is at a temperature and in an amount such as to immediately lower the temperature of the reaction effluent stream to a point at which side reactions are inhibited. Thereafter the less saturated hydrocarbon referred to which is in solution in the quenching solvent is removed therefrom in any suitable way as by stripping or distilling in known manner and passed to further processing steps.

In accordance with the present invention, a selective solvent for the unsaturated hydrocarbon produced by the dehydrogenation is itself utilized as the quenching medium in such manner as to enable it to function simultaneously as a quenching agent and as a selective solvent. Selective solvent extraction in a fractionating column using a suitable selective extraction solvent (now known as "extractive distillation") has been found to be a highly desirable method for the separation and recovery of olefins from paraffins and of diolefins from both paraffins and olefins. A typical example is the use of furfural in a rectifying column to extract butadiene from a C₄ stream containing the same, as disclosed in copending applications of Hachmuth, Serial No. 438,844, filed April 13, 1942, and Serial No. 454,312, filed August 10, 1942.

In proceeding in accordance with the present invention in one embodiment, the quenching and dissolving step may be so conducted that rectification takes place simultaneously therewith, the less saturated aliphatic hydrocarbon being selectively absorbed and the more saturated hydrocarbon passing overhead. For such an embodiment, I may use a conventional fractionating column equipped with the conventional bubble plates or trays or the equivalent thereof such as packing, Raschig rings, or the like. In such an embodiment, the cold quenching solvent might conveniently be introduced at or adjacent the top of the column and descend therein countercurrently to the gaseous reaction effluent introduced at a low point in the column and ascending therein and the solvent rich in the less saturated hydrocarbon be withdrawn from the bottom of the column and passed to a stripping unit where desorption is effected.

I may carry out the process of the present invention in such manner as to utilize the heat content of the reaction effluent to supply the necessary heat for the fractionation step or steps.

Alternatively I may so operate that the heat of absorption is utilized to supply the heat for the fractionation, this being convenient where a contacting zone is disposed intermediate the dehydrogenation zone and the fractionation unit. If desired the solvent may also serve in effect as a heat carrier in addition to its quenching and separating functions.

The solvent used in accordance with the present invention may be either high-boiling or low-boiling. Where a high-boiling solvent is used, it may be introduced at an elevated temperature and pressure but below equilibrium temperature of the reaction, in order to halt the reaction and prevent side reactions and re-reaction, while at the same time maintaining the solution at a high enough temperature to permit stripping of the dissolved hydrocarbons by release of pressure and introduction into a stripping zone. This may be especially applicable to the effluent from the first stage of a two-stage process, the so stripped hydrocarbons being thereby evolved at an elevated temperature which renders them more suitable for introduction to the second stage.

A very desirable method of operating is to use a relatively low-boiling selective solvent. Where a volatile selective solvent is utilized, any vaporization thereof which occurs will aid in effecting cooling of the reaction effluent, and the vaporous mixture may be condensed for separation of solvent, solute and lighter gases.

The solvent may be chosen with respect to its desired volatility, stability at the relatively high temperatures involved and selectivity for the several hydrocarbons. As pointed out above, it should display relatively low solubility for paraffins, a greater solubility for the aliphatic olefins and a still greater solubility for the aliphatic diolefins. In other words, its solvent power for hydrocarbons should vary directly with the unsaturation of the hydrocarbons. Ordinarily, in solvent extraction of butadiene-containing hydrocarbon mixtures and the like, quite large volumes of solvent must be used relative to the volume of material undergoing treatment, so that the use of solvents in accordance with the present invention enables any desired degree of cooling to be accomplished without the introduction of more solvent than is necessary in the subsequent extraction.

Figure 2:
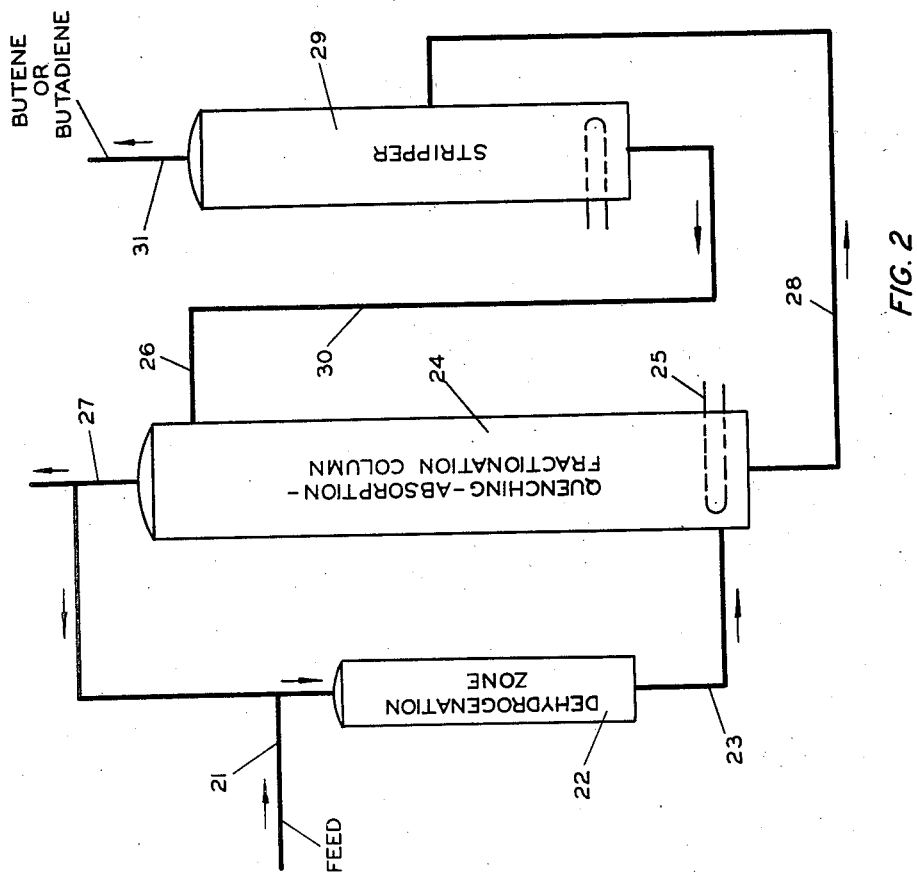
Figure 3:
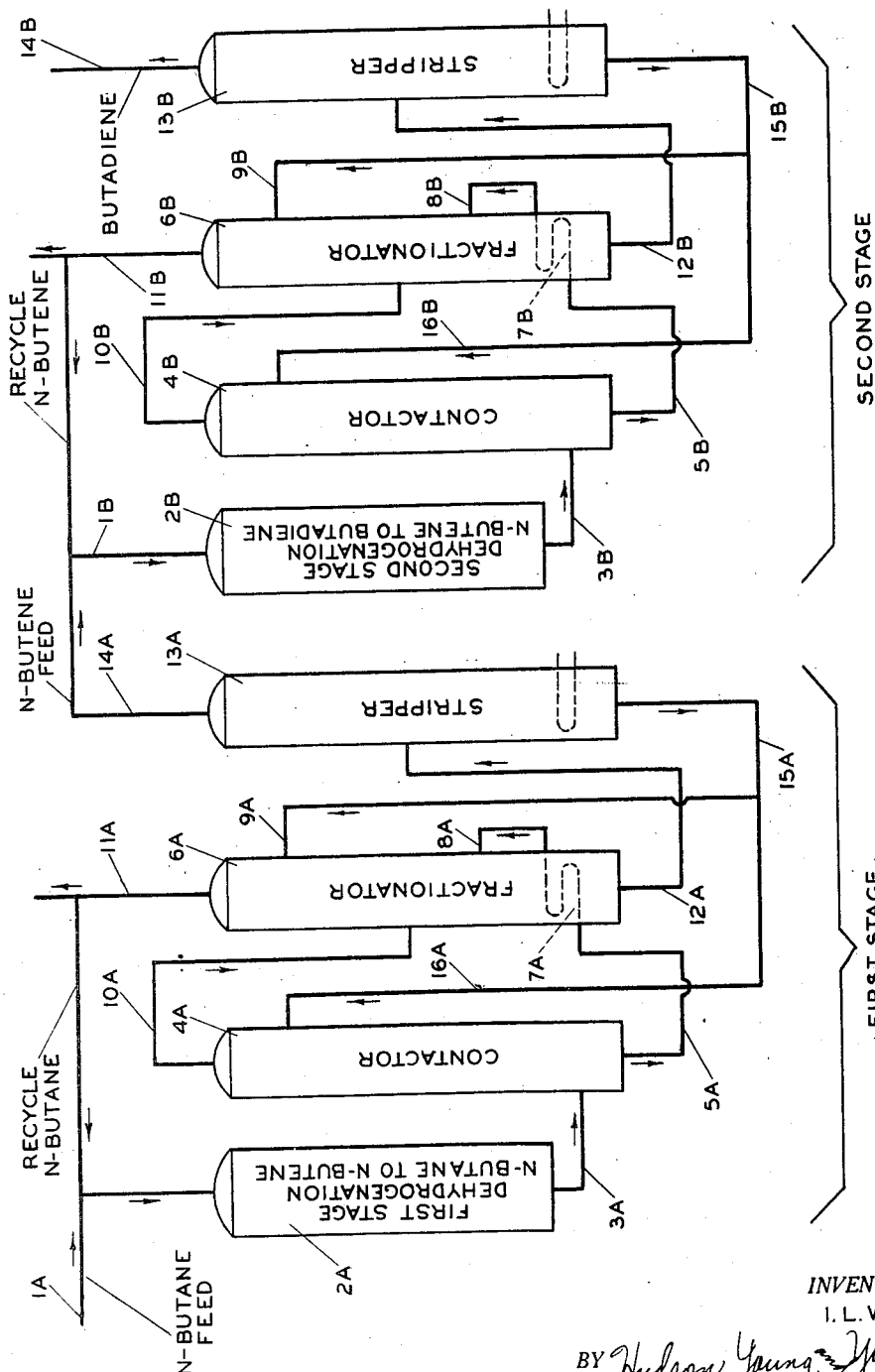

In the accompanying drawings, Figure 1 illustrates diagrammatically one arrangement of equipment which may be used in carrying out the present invention in an embodiment wherein a quenching zone is interposed between the converter and the fractionator, while Figure 2 portrays an embodiment in which a single tray or packed column of the fractionating type is used for directly effecting quenching, selective solution and rectification of the hot reaction effluent in a single zone and simultaneously. Figure 3 illustrates the application of the embodiment of Figure 1 in two-stage dehydrogenation of normal butane to butadiene.

Referring now to the drawings, Figure 1 shows the present invention as it is applied to the dehydrogenation of a C4 feed of normal butane and/or normal butene to butadiene and usually a mixture of normal butane and butene. The feed is introduced at a suitable temperature via line 1 into dehydrogenation zone 2 which contains a suitable dehydrogenation catalyst such as bauxite, alumina or other known dehydrogenation catalyst. The feed is preheated to reaction temperature before entering 2. The hot butadiene-containing effluent is fed via line 3 directly into contactor 4 where the hot stream meets a stream of relatively cold selective solvent which serves to quench the effluent and selectively dissolves butadiene along with portions of butene. The liquid solution of butadiene and butene is then introduced via line 5 into fractionating column 6 near the bottom thereof, the stream being first passed through coil 7 in indirect heat exchange with the bottom of the column so that heat for the kettle will be supplied by the hot solution. From coil 7 the butadiene-containing stream is introduced into the column at 8 where it meets a stream of additional fresh solvent introduced at the top of column through line 9. The gaseous phase from contactor 4 which contains butene, some butadiene not dissolved by the solvent, and possibly some butane, may be introduced via line 10 at an intermediate point in column 6 which point is nearer the top of the column than the more butadiene-rich solution. A butene-, and possibly butane-, containing stream is taken off overhead from column 6 via line 11 and either vented or recycled as desired. When volatile solvent is used, the gaseous phase in line 10 will also contain some solvent vapor.

Contactor 4 may be either a packed or a tray-type column or it may be a mixing zone of any other suitable type. In some cases it may be desirable to mix the solvent directly with the hot effluent by injection into the outlet line 3 from the catalytic converter. In such case, the hot mixture which is now, however, substantially below the reaction temperature may be passed through suitable means for separating liquid and gas phases, whereupon they may be introduced to column 6 via lines 5 and 10 respectively.

In fractionator 6, the solvent becomes saturated with practically pure butadiene and leaves as a kettle product via line 12 by which the solution is fed to stripper 13 where the butadiene is stripped and leaves overhead via line 14 while the stripped solvent leaves via line 15 for return to the top of column 6 via line 9 and for return to the contactor 4 via line 16.

For the single stage dehydrogenation of butane to butadiene using the apparatus of Figure 1, the feed will of course be normal butane and separated butene may be recycled to the dehydrogenation zone if desired. The arrangement of Figure 1 may also be used where the principal product desired to be recovered is butene, in which case the fractionation in 6 is conducted under conditions which will permit butenes to be separated as a kettle product in the same manner as described above for butadiene.

In the event that the present invention is to be applied to the two stage dehydrogenation of normal butane to butadiene, the feed to reactor 2 will be normal butane and the principal reaction product will be normal butene which will be quenched and fractionated in the manner described above for butadiene in apparatus like that shown in Figure 1. The normal butene obtained as an overhead product from stripper 13 will then be introduced into a second stage which will be like that shown in Figure 1, and butadiene will be the final product. An arrangement of equipment such as is portrayed in Figure 3 may be used for such an operation. In Figure 3, each of the two stages is exactly like the single stage shown in Figure 1 with corresponding reference numerals except that the reference numerals applied to the elements of the first stage have the suffix "A" while those for the second stage have the suffix "B." Conditions in each of the two stages will of course be adapted to the particular feed in each stage.

Referring to Figure 2, which like Figure 1 may be applied either to a single stage or a two-stage process, the feed enters via line 21 and passes into catalytic dehydrogenation zone 22. The effluent passes via line 23 directly and immediately into column 24 which combines the functions of quenching and extractive distillation (selective solvent extraction and rectification). While the drawing shows a heating coil 25 in the bottom of column 24 this will usually be unnecessary and the heat content of the effluent gas will supply all of the heat needed for operation of column 24. The lean solvent is fed into the top of column 24 via line 26. Column 24 is provided with the usual contacting means, namely, plates or packing. The undissolved gases pass overhead via line 27 for venting or recycle. The rich solvent leaves the bottom of the column via line 28 and enters stripper 29. The stripped solvent is returned via line 30, while the butene or butadiene is removed via line 31.

The conditions of the dehydrogenation such as temperature, pressure, contact time, catalyst used, ets., have not been specified in detail since they are well within the skill of those versed in the art and moreover per se form no part of the present invention. Obviously, the conditions used will depend upon the hydrocarbon feed being dehydrogenated and upon whether a one-stage or a two-stage process is used. The dehydrogenation conditions for a $C_4$ charge such as normal butane and/or normal butene will be different from those for a heavier charge such as one of $C_5$ or $C_6$ paraffins and/or olefins. In this connection it may be stated that while the invention is applicable to the dehydrogenation of $C_2$ or heavier paraffins, including ethane, propane, normal butane, isobutane, etc., to the corresponding olefins, it is preferred to apply it to the dehydrogenation of $C_4$ or higher paraffins or olefins to the corresponding olefins or diolefins, especially normal butane or butene to normal butene or butadiene.

Typical methods of catalytically dehydrogenating paraffins or olefins to the corresponding olefins or diolefins, and dealing especially with $C_4$ hydrocarbons are shown, for example, in Schmidt et al., 1,732,381; Grosse, 2,167,650, and 2,178,584; Morrell, 2,178,601; Morrell et al., 2,178,602; Wiezevich et al., 2,209,215; Grosskinsky et al., 2,265,641; Groll et al., 2,184,235; Frey et al., Re. 21,911; Huppke and Frey, 1,905,383; Frey et al., J. Ind. Eng. Chem. 25, 54–59 (1933).

Ordinarily the temperature in the catalytic dehydrogenation zone will range from about 350° C. (662° F.) to about 700° C. (1292° F.). Ordinarily in the case of a two-stage conversion, say of normal butane to butylene, which is then converted in the second stage to butadiene, typical temperatures may be from 900–1200° F. in the first stage and 1000–1300° F. in the second stage.

The temperature to which the hot dehydrogenation effluent is immediately quenched by contact with the selective solvent in accordance with the present invention is substantially below the reaction temperature and substantially below the temperature at which any re-reaction or side reactions would occur. Usually it will be at least 100° F. below the reaction temperature and the lowest temperature at which the dehydrogenation would occur. Often it will be as low as 500° F. or even lower, say down to room or ambient temperatures.

While any selective solvent having the desired selective qualities described above and otherwise possessing suitable properties for the purpose in question may be used in accordance with my invention, the following may be enumerated as typical. Among the less readily volatile compounds and, therefore, ordinarily more suitable for the purpose, are furfural, which is most highly preferred, the n,n,-substituted dialkyl fatty acid amides such as dimethyl formamide, diethyl formamide, etc., benzaldehyde, nitrobenzene, aniline, furfural alcohol, furfural amine, furonitrile, dichloroethyl ether ("Chlorex"), phenol, cresol, cresylic acid, xylenol, resorcinol, ethylene chlorohydrin, benzyl acetate, phenol acetate, methyl furoate, diethyl tartrate, dimethyl sulfate, dimethyl phthalate, nitro-olefins such as nitroisobutylene, phenyl hydrazine, dioxane, ethylene dichloride, glycerine, ethylene glycol, etc. Use of such low-boiling solvents as acetaldehyde, propionaldehyde, propylene oxide (1,2), ethylene oxide, methyl formate, methyl alcohol, sulfur dioxide, liquid anhydrous ammonia, etc., is possible but is ordinarily not preferred because of the large quantities that must ordinarily be supplied in order to reduce the temperature of the hot vaporous dehydrogenation effluent.

From the foregoing, it will be seen that my invention presents numerous advantages over prior methods for the dehydrogenation of paraffins or olefins to the corresponding olefins or diolefins. Chief among these advantages is the fact that immediate quenching to a point such that re-reaction and side reactions are prevented and separation of the desired reaction product, namely, the olefin or diolefin, are simultaneously effected in a simple and economical manner. Another advantage is that the heat content of the reaction effluent is used to supply heat of fractionation or rectification. Another advantage is that prevention of polymerization of butadiene and separation thereof are attained. Still another advantage is that a process is provided which is readily applicable to either the one-stage or the two-stage dehydrogenation to butadiene. Numerous other advantages will be apparent to those skilled in the art.

I claim:

1. A process for the preparation of butadiene from normal butane which comprises dehydrogenating normal butane to produce a butene-containing stream, immediately contacting said stream with a relatively cool solvent selective for butene to reduce the temperature of said stream sufficiently to prevent side reactions therein, separating butene from said solvent, dehydrogenating said butene to produce a butadiene-containing stream, immediately contacting said last-named stream with a relatively cool solvent selective for butadiene to reduce the temperature of said stream sufficiently to prevent side reactions therein, and separating butadiene from said solvent.

2. A process for the preparation of less saturated hydrocarbons from more saturated hydrocarbons which comprises subjecting said more saturated hydrocarbons to dehydrogenation at elevated temperatures to produce a stream containing said less saturated hydrocarbons, promptly contacting said stream with sufficient of a relatively cool solvent selective for said less saturated hydrocarbons to lower the temperature of said stream to a point at which side reactions therein are inhibited, introducing the solution of solvent and less saturated hydrocarbons at an intermediate point of a fractionating column, introducing additional solvent adjacent the top of the column, introducing the undissolved portion of said stream at a point in said column between said intermediate point and the point at which said additional solvent is introduced, and selectively removing said more saturated hydrocarbons as an overhead product and said less saturated hydrocarbons in solution in said solvent as a bottom product.

3. In a process for the dehydrogenation of hydrocarbons to produce less saturated hydrocarbons therefrom by conversion of said hydrocarbons under dehydrogenation conditions of temperature and pressure, the steps which comprise quenching the effluent from the dehydrogenation zone with sufficient relatively cool selective solvent for said less saturated hydrocarbon to reduce the temperature of said effluent to a point at which side reactions and re-reaction are prevented but insufficient to lower the temperature of the resulting solution of said less saturated hydrocarbon in said solvent below the boiling point of said less saturated hydrocarbon and thereby effecting preferential solution of said less saturated hydrocarbon in said solvent while causing more saturated hydrocarbon to be undissolved, flowing the resulting hot solution of said less saturated hydrocarbon in said solvent in indirect heat exchange with the kettle of a fractionating column thereby supplying heat for said column and subsequently introducing said solution into said column at an intermediate point thereof, introducing an additional amount of said solvent at a higher point in said column, and selectively removing a solution of said less saturated hydrocarbon in said solvent from said column as a bottom product while removing said more saturated hydrocarbon overhead.

4. A process for the preparation of a diolefin from a normal paraffin which comprises dehydrogenating said normal paraffin to produce an olefin-containing stream, immediately contacting said stream with a relatively cool solvent selective for said olefin to reduce the temperature of said stream sufficiently to prevent side reactions therein, separating the olefin from said solvent, dehydrogenating said olefin to produce a diolefin-containing stream, immediately contacting said diolefin-containing stream with a relatively cool solvent selective for said diolefin to reduce the temperature of said stream sufficiently to prevent side reactions therein, and separating the diolefin from said solvent.

5. A process according to claim 2 in which the more saturated hydrocarbon is butene and the less saturated hydrocarbon is butadiene.

I. LOUIS WOLK.